United States Patent
Durkin (10) Patent No.: US 7,151,823 B2
(45) Date of Patent: *Dec. 19, 2006

(54) DETERMINING WHETHER A TELEPHONY CALL IS PERMITTED BASED ON PERMISSION DATA

(75) Inventor: David P. Durkin, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 89 days.

This patent is subject to a terminal disclaimer.

(21) Appl. No.: 10/666,027

(22) Filed: Sep. 17, 2003

(65) Prior Publication Data

US 2004/0062368 A1    Apr. 1, 2004

Related U.S. Application Data

(63) Continuation of application No. 09/327,896, filed on Jun. 8, 1999, now Pat. No. 6,647,099.

(60) Provisional application No. 60/088,449, filed on Jun. 8, 1998.

(51) Int. Cl.
*H04M 11/00* (2006.01)

(52) U.S. Cl. ............................ 379/93.02; 379/93.05

(58) Field of Classification Search .. 379/88.22–88.23, 379/90.01, 93.01–93.02, 93.05–93.06, 93.09, 379/93.11, 100.15–100.16, 201.01–201.03, 379/207.02–207.03, 207.11, 210.02, 902–903, 379/100.01, 142.06, 265.09, 189; 370/341, 370/431, 420; 340/825.5; 375/222; 358/400; 710/36

See application file for complete search history.

(56) References Cited

U.S. PATENT DOCUMENTS

| | | | |
|---|---|---|---|
| 4,546,213 A | 10/1985 | Dick | |
| 4,680,773 A | 7/1987 | Amundson | |
| 4,850,008 A | 7/1989 | Berg et al. | |
| 4,905,281 A | 2/1990 | Surjaatmadja et al. | |
| 4,958,153 A | 9/1990 | Murata et al. | |
| 5,048,076 A | 9/1991 | Maurer et al. | |
| 5,081,621 A | 1/1992 | Sugimoto | |
| 5,131,025 A | 7/1992 | Hamasaki | |
| 5,146,472 A | 9/1992 | Hallman | |
| 5,153,918 A | 10/1992 | Tuai | |
| 5,276,687 A * | 1/1994 | Miyamoto | 370/420 |
| 5,313,653 A * | 5/1994 | Sasuta | 455/17 |
| 5,436,957 A | 7/1995 | McConnell | |
| 5,440,619 A | 8/1995 | Cann | |
| 5,471,522 A * | 11/1995 | Sells et al. | 379/93.11 |
| 5,481,562 A | 1/1996 | Pearson et al. | |
| 5,483,596 A | 1/1996 | Rosenow et al. | |
| 5,495,483 A | 2/1996 | Grube et al. | |
| 5,499,287 A | 3/1996 | Beck et al. | |
| 5,546,448 A * | 8/1996 | Caswell et al. | 379/142.05 |
| 5,724,426 A | 3/1998 | Rosenow et al. | |
| 5,761,288 A | 6/1998 | Pinard et al. | |
| 5,815,682 A | 9/1998 | Williams et al. | |

(Continued)

*Primary Examiner*—Melur Ramakrishnaiah (57) ABSTRACT

Apparatus and methods to store permission data relating to security for a system and to receive a request to establish a telephony call. In response to the request, the telephony call is established, and after establishing the telephony call, an indication of a type of the telephony call is detected. Based on permission data relating to security for the system, it is determined whether the type of the telephony call is permitted.

27 Claims, 7 Drawing Sheets

U.S. PATENT DOCUMENTS

| | | |
|---|---|---|
| 5,864,710 A | 1/1999 | Sands et al. |
| 5,878,142 A | 3/1999 | Caputo et al. |
| 5,884,262 A * | 3/1999 | Wise et al. .............. 704/270.1 |
| 5,938,745 A * | 8/1999 | Boyle .......................... 710/36 |
| 5,946,386 A * | 8/1999 | Rogers et al. ......... 379/265.09 |
| 6,167,123 A * | 12/2000 | Kwok et al. ........... 379/100.01 |
| 6,249,575 B1 * | 6/2001 | Heilmann et al. .......... 379/189 |
| 6,298,122 B1 | 10/2001 | Home |
| 6,327,343 B1 | 12/2001 | Epstein et al. |
| 6,647,099 B1 * | 11/2003 | Durkin .................... 379/93.02 |

* cited by examiner

FIG. 1

| NOT USED | NOT USED | INBOUND DATA | OUTBOUND DATA | INBOUND FAX | OUTBOUND FAX | INBOUND VOICE | OUTBOUND VOICE |
|---|---|---|---|---|---|---|---|
| | | 1 | 0 | 1 | 0 | 1 | 1 |

DETERMINING WHETHER A TELEPHONY CALL IS PERMITTED BASED ON PERMISSION DATA

CROSS-REFERENCE TO RELATED APPLICATIONS

This is a continuation of U.S. Ser. No. 09/327,896, filed Jun. 8, 1999, now U.S. Pat. No. 6,647,099, which claims the benefit under 35 U.S.C. § 119(e) of U.S. Provisional Patent Application Ser. No. 60/088,449 filed Jun. 8, 1998, both of which are hereby incorporated by reference.

BACKGROUND

A modem is a device that has traditionally allowed a computer system to transmit and receive data over a telephone line. Today, many modems can transmit voice and fax as well as data. Modems are currently implemented in a variety of ways. For example, a host based "controllerless" modem typically includes a codec on a peripheral board, but the modem controller code is executed by a host processor. A native signal processing modem typically implements a signal processing component on the host system itself to generate modem signals. Peripheral modems processor in conjunction with a modem microcontroller, and a strictly digital signal processor oriented approach. All of these approaches, however, provide for code that is either executed by the host processor, the microcontroller on the modem itself, or the digital signal processing code to implement the modem functionality. These approaches necessarily enhance the flexibility of modems, especially when this code is implemented in a flash ROM. This is because the modem can be reconfigured to adapt it to new implementations of communication protocols and to add other features that may be desirable in the modem.

While modem interfaces are standardized a number of different communications protocols for formatting data, to be transmitted over telephone lines exist. For example, standardized communication protocols include: Bell 103, CCITT V.21, Bell 212A, ITU V.22, ITU V.22bis, ITU V.29, ITU V.32, ITU V.32bis, ITU V.34, and ITU V.90. These and other protocols are well known to those of ordinary skill in the art. In many modems, flash ROMS have been utilized to enable the upgrading of communications protocols.

Telephony is the science of translating sound into electrical signals transmitting them through a medium and then converting back to sound. Computer telephony integration (CTI) refers to computer systems that enable a computer to act as a call center accepting incoming calls and routing them to the appropriate device or user. Currently, CTI systems have advanced such that most are capable of handling incoming and outgoing communications that include: phone calls (voice), faxes, and Internet messages. The advance in CTI has, in part, been aided by advance in software interfaces. One such interface is telephony application program interface (TAPI). TAPI is an application programmer interface (API) designed to connect a computer system running a windows-based program or operating system to telephone services. TAPI is well known to those of ordinary skill in the art. Another interface that is of particular interest to device driver developers is telephony service provider interface (TSPI). The TSPI is a software interface that sets between a Windows telephony dynamic link library (DLL) and a hardware specific device driver that is also known as a telephony service provider (TSP). The TSP provides an interface to the telephony hardware. The TSPI is well known to those of ordinary skill in the art.

In a typical local area network (LAN) a network firewall determines which LAN services are available from outside of the LAN and what outside services are available to those internally connected to the LAN. For the network firewall to be effective all outside traffic must pass through the firewall where it can be inspected. When performing as designed, the firewall permits only authorized traffic to pass and blocks dubious traffic. Unfortunately, the firewall cannot offer any protection once an attacker has gotten through or around the firewall. For example, if unrestricted dialout is permitted from inside the protected network internal users can make a direct serial line Internet protocols (SLIP) or point-to-point protocol (PPP) connection to an Internet service provider (ISP). These types of connections bypass the security provided by even the most carefully constructed firewall and create a significant opportunity for backdoor attacks.

DETAILED DESCRIPTION

The system according to some embodiments of the invention implements a modem or modem driver with a variety of desirable features. These features include the ability to individually enable or disable inbound data, outbound data, inbound fax, outbound fax, inbound voice, and outbound voice. These capabilities may be individually enabled or disabled by an administrator thereby controlling and authorizing user operations. In one embodiment a bit mask representing permission states is stored in modem associated memory. Each feature has an assigned bit in the bit mask. This modem associated memory may be RAM, ROM, EPROM, EEPROM or flash ROM. When the modem memory is flash ROM the states may be changed by an administrator via software.

Figure 1:
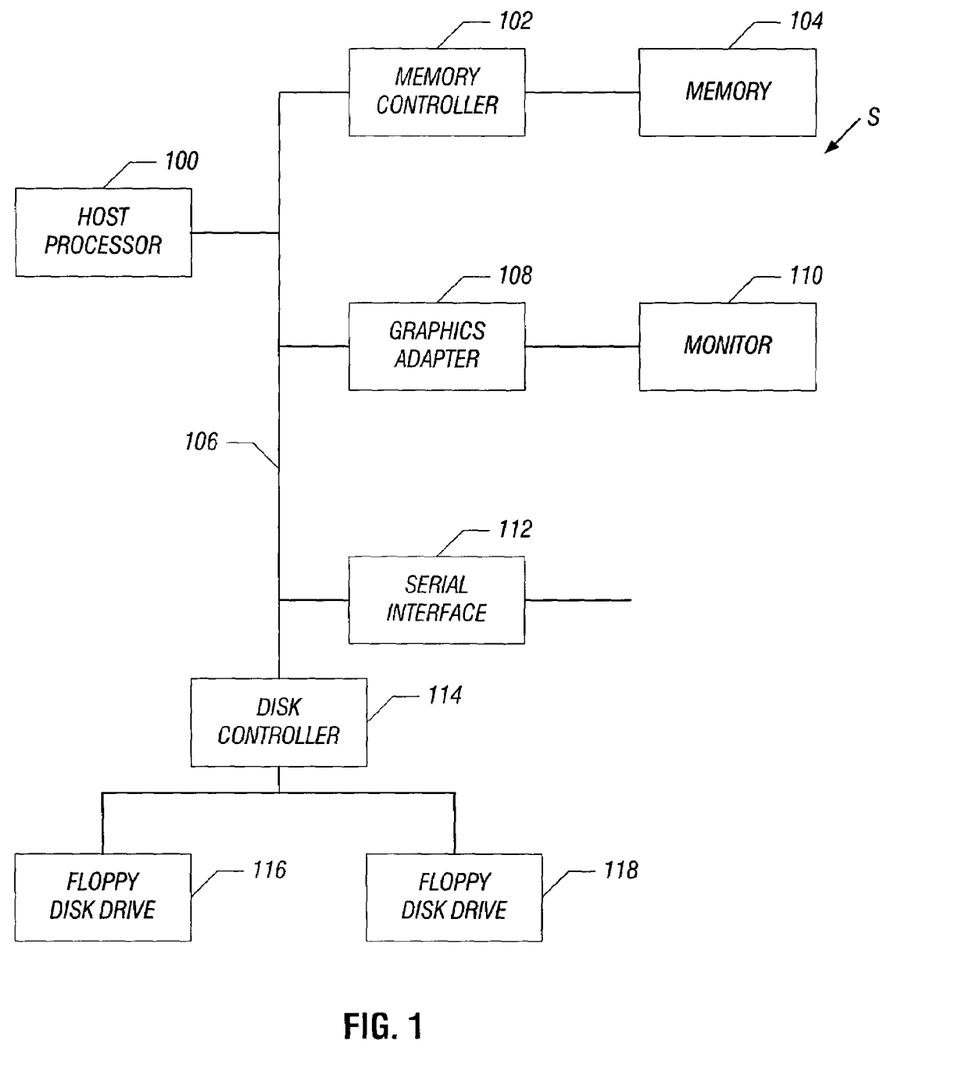
FIG. 1 illustrates a typical computer system S implemented according to an embodiment of the invention.

Turning to FIG. 1, illustrated is a typical computer system S implemented according to the invention. While the system S is illustrative of one embodiment, techniques according to the invention can be implemented in a wide variety of systems. As illustrated, a host processor 100 is coupled to a memory controller 102, a graphics adapter 108, a serial interface 112, and a disk controller 114 through a bus 106. For simplicity, various circuitry that would be necessary to couple these components is not illustrated.

The host processor 10 can be a Pentium® (manufactured by Intel Corporation) or any other appropriate processor. The memory controller 102 controls system memory 104. The system memory 104 would include dynamic random access memory (DRAM) appropriate for a given processor. The computer system S utilizes Flash read only memory (ROM) (not shown) to implement the preferred embodiment of the invention. The graphics adapter 108 is coupled to a monitor 110. Again, the disk controller 114 controls floppy disks disk drive 116 and hard disk drive 118. The serial interface 112 couples the computer system S to a telephone line. The serial interface 112 may couple the computer system S to the telephone line directly (in the case of a software modem) or couple the computer system S to a modem (not shown). In the latter configuration, the modem will in turn couple the computer system S to the telephone line.

A software or firmware based modem typically allows for enhanced operating system compared to a hardware modem. This is because using software enables permissions to be set in order to establish a COS for an individual user and/or groups of users within an organization. Permissions are individual privileges assigned to a user or a group of users, which allow or disallow for specific operation. Permissions may be established in order to establish security requirements or otherwise control usage of enterprise resources to promote good business practices. Utilizing permissions for added security can result in a flexible back-up firewall. For example, when outbound data calls are not permitted no communication application package can establish outbound data communications. Utilizing permissions in this manner allow an individual feature to be disabled at the lowest level—that is in a modem's hardware, firmware or driver-stack.

Permissions can be set via a stand-alone utility or through an embedded software flash utility. In one embodiment, an administrator can set various permissions remotely via a centralized location. For example, the administrator might utilize System Management Server (SMS), Policy Editor, Insight Manager, Carbon Copy, PC Anywhere or any other facility that provides remote access. These and other tools that assist the administration of LANS are well known to those of ordinary sill in the art. When embedded into intelligent application creative features which can augment system command and control may be implemented. For example, modem resources could be shut down in real time when a problem occurs by toggling one or more permission bits.

Figure 2:
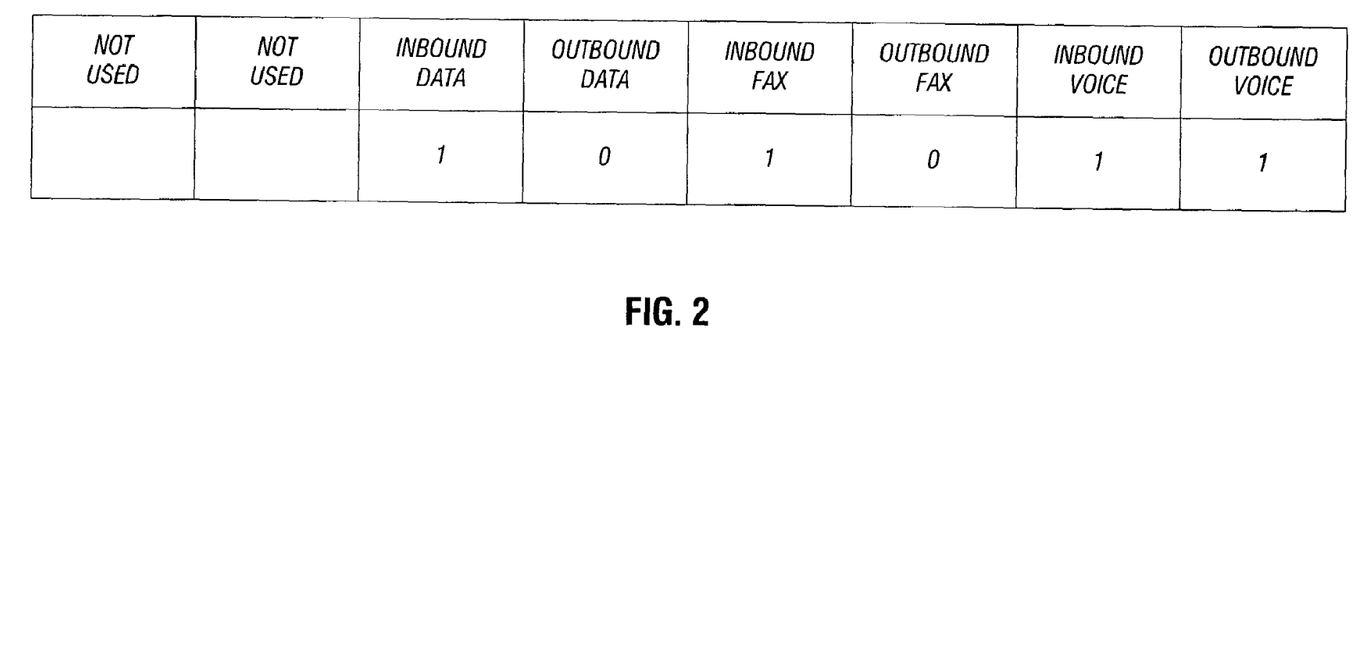
FIG. 2 shows a bit mask which corresponds to individual permission according to an embodiment of the invention.

Turning to FIG. 2, illustrated is a bit masks which corresponds to individual permissions. While this bit mask is illustrated to be 8 bits it could, of course, be smaller such as nibble (4 bits) if some features are not needed. For example, a nibble would allow for inbound and outbound data and fax call control. A '1' enables a feature, and '0' disables a feature. The illustrated example of FIG. 2 allows inbound data, inbound fax, inbound voice, and outbound voice, and disables outbound data and outbound fax. This effectively establishes a COS for an individual user. Because bit mask, in the preferred embodiment, is located in flash memory it can be controlled through software. This modem firmware embodiment enables or disables the features associated with the bit mask at the lowest point. All third party communication applications are governed by the permission settings.

Figure 3:
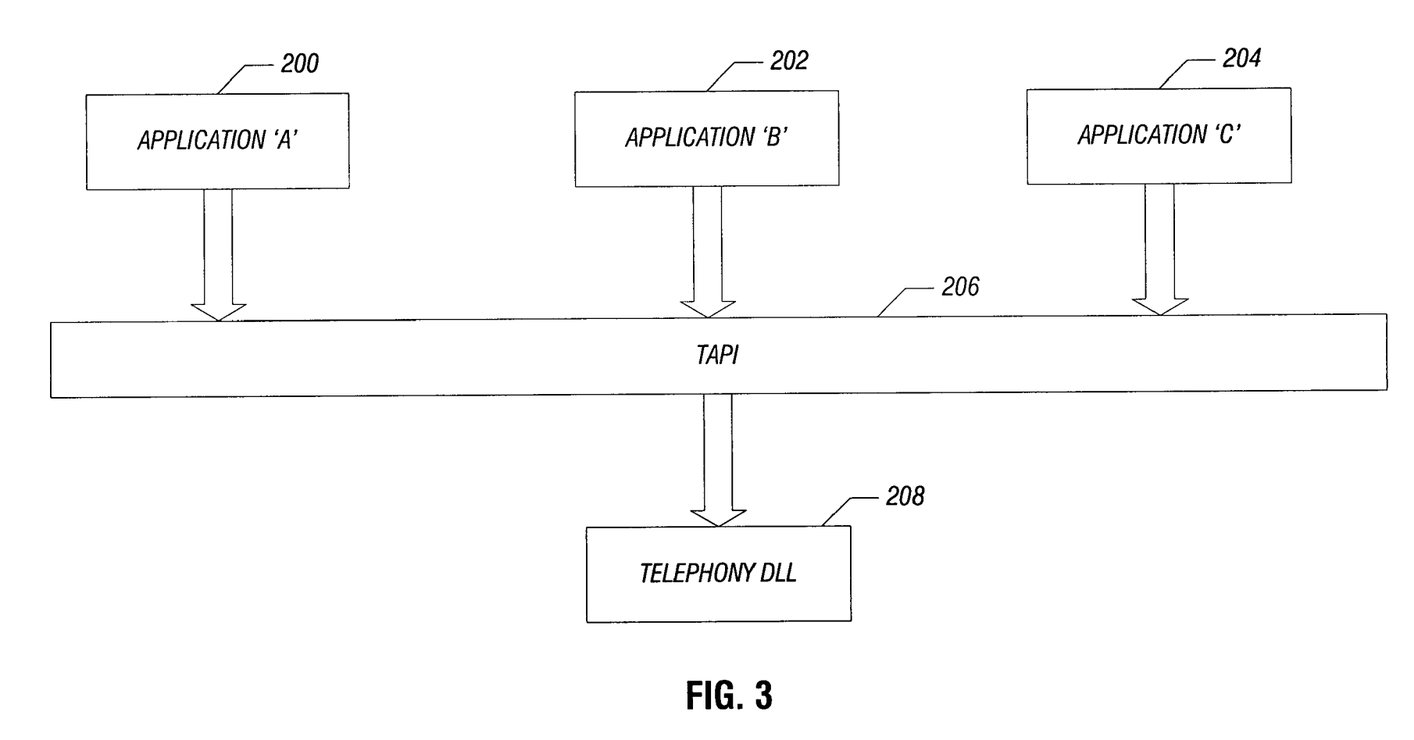
FIG. 3 depicts an example of how an application running on a computer system S interacts with a TAPI.

Moving to FIG. 3, illustrated is a typical example of how an application 200, 202, 204, running on a computer system S interacts with a TAPI 206. The applications 200–204 are shown as being coupled to the TAPI 206 and isolated from the telephony dynamic link library (DLL) 208. This isolation simplifies the installation and support of PC based communication software. Traditionally communication software has been complex to install and difficult to support because the application 200–204 would have been able to communicate with the telephony hardware directly. This means that the application 200–204 would potentially have to know hundreds of different modem types of the user would have to carry out a complex installation process. Using the TAPI 206 any TAPI compatible application can utilize a hardware driver coupled to a telephony DLL 206.

Figure 4:
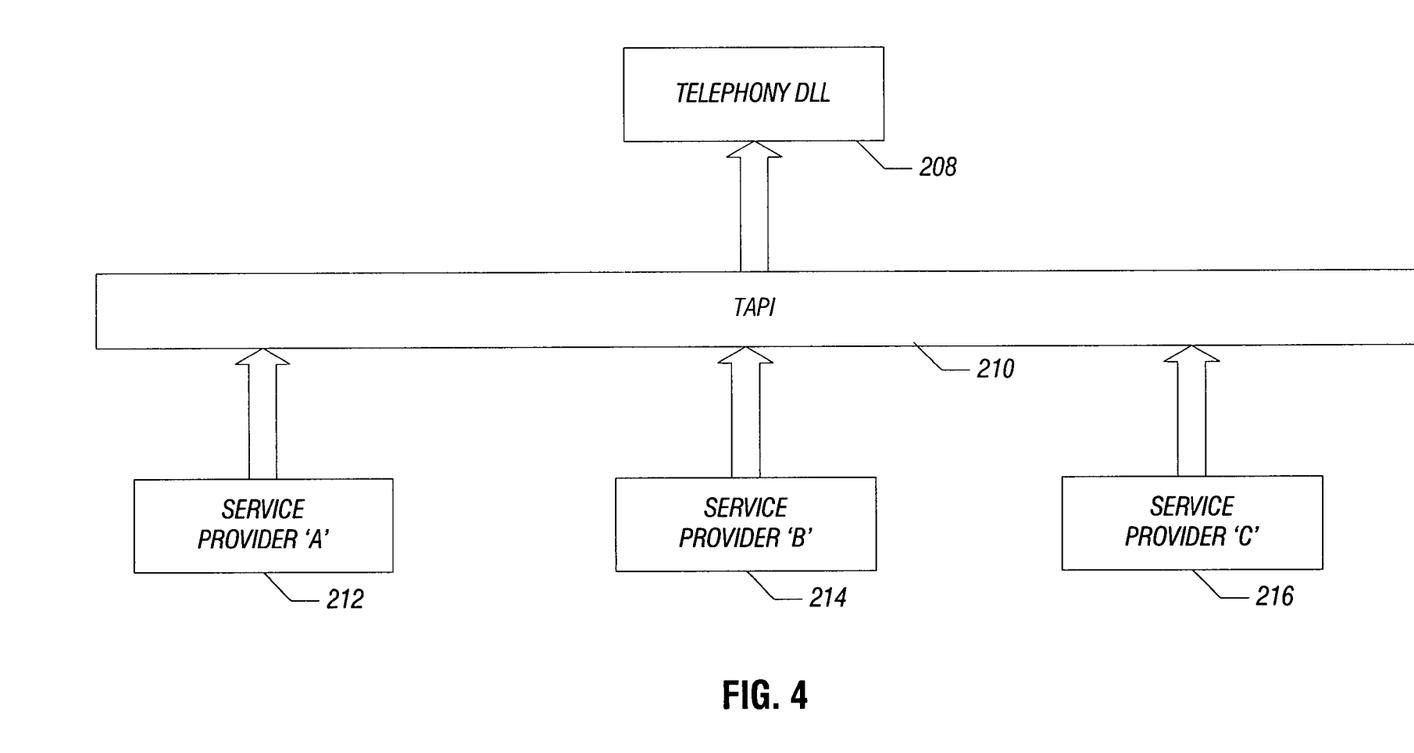
FIG. 4 illustrates the connection between a TSPI and a telephony DLL.

A second interface, a telephony service provider interface (TSPI) is also a software interface. The TSPI resides between a Windows telephony DLL and what are known as telephony service providers (TSPs). The TSPs are hardware specific device drivers, which provide the interface to the telephony hardware. When one of the TSPs is coupled to a modem that TSP can function to translate a TSPI request, for example, to a number to be dialed. FIG. 4 illustrates the connection between a TSPI 210 and a telephony DLL 208. As previously stated, TSPs 212, 214, and 216 are hardware specific drivers.

Figure 5:
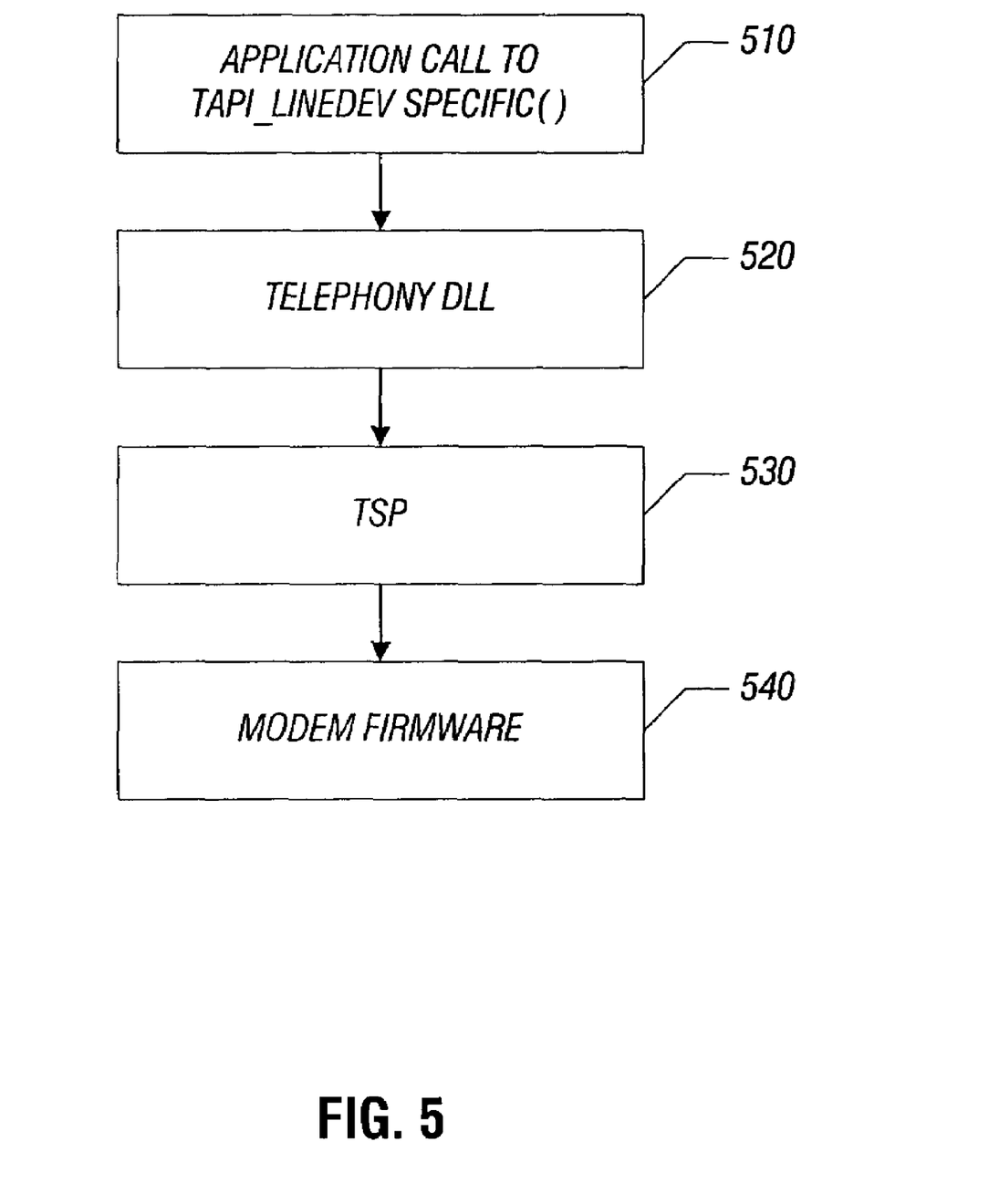
FIG. 5 depicts command flow through the TAPI.

The control of flow through the TAPI 206 is further illustrated in FIG. 5. One of the applications 200–206 places a call to the TAPI layer 206 via the TAPI_LINEDEV SPECIFIC( ) routine. A unique identifier is translated by the appropriate TSP 212–216. The identifier corresponds to an action requested. That action might include the identifier to enable fax in, disable fax in, enable fax receive, disable fax receive, enable data send, disable data send, enable data receive, or disable data receive. Windows passes the call from the application 200–206 through the TAPI DLL 208 to the TSP 212–216. The TSP 212–216 is entered and the identifier is read. The TSP 212–216 then issues an appropriate command to the modem firmware 218. The modem firmware 218 interprets the command and toggles the permission bit mask and flash memory, as appropriate. The modem firmware 218 acknowledges the appropriate TSP 212–216 which in turn eventually acknowledges the appropriate application 200–204.

There are several other ways in which administrative control can be implemented. Registry settings may be used to control the enabling and disabling of the permission bits. This is accomplished by writing a zero or a one, "true"/"false", "yes"/"no", "on"/"off", or other appropriate value to the specific permission bit. For example, a value of zero would be used to disable a feature and a value of one would be used to enable the same feature. Such registry values could appear as:

---

My Computer
    HKEY_LOCAL_MACHINE
        Security
            Modem
                Data_receive Ox 1
                Data transmit Ox 1
                Fax_receive Ox 1
                Fax_transmit Ox 1
                Voice_transmit Ox 1
                Voice_receive Ox 1

---

Security aware application can poll these keys and dynamically set and reset the permissions via the TAPI or using direct calls to the firmware. Assuming such an application or utility is available to an administrator, the administrator can dynamically issue commands to the firmware. As previously discussed, administrators can use the Policy Editor employed on NT systems, SMS, PC Anywhere, or Carbon Copy to change these values. In addition COS groups can also be associated with server based installation of product software. Utilizing SMS, package definition files (PDF), will also allow the administrator to establish different classes of services for different users. For example, the administrator could create an installation folder on a server with the PDF COS for the sales group and a different PDF COS for the marketing group.

In another embodiment, a flash utility can also be used to send commands directly to the modem firmware via proprietary commands. These commands would be dependent on the architecture used by the designer. Upon launch of the application a simple graphical user interface (GUI) or character based interface prompts the user to enter a password. Upon successful entry the administrator can change the password or select appropriate check boxes. This utility would be particularly useful for local client administration.

Figure 6:
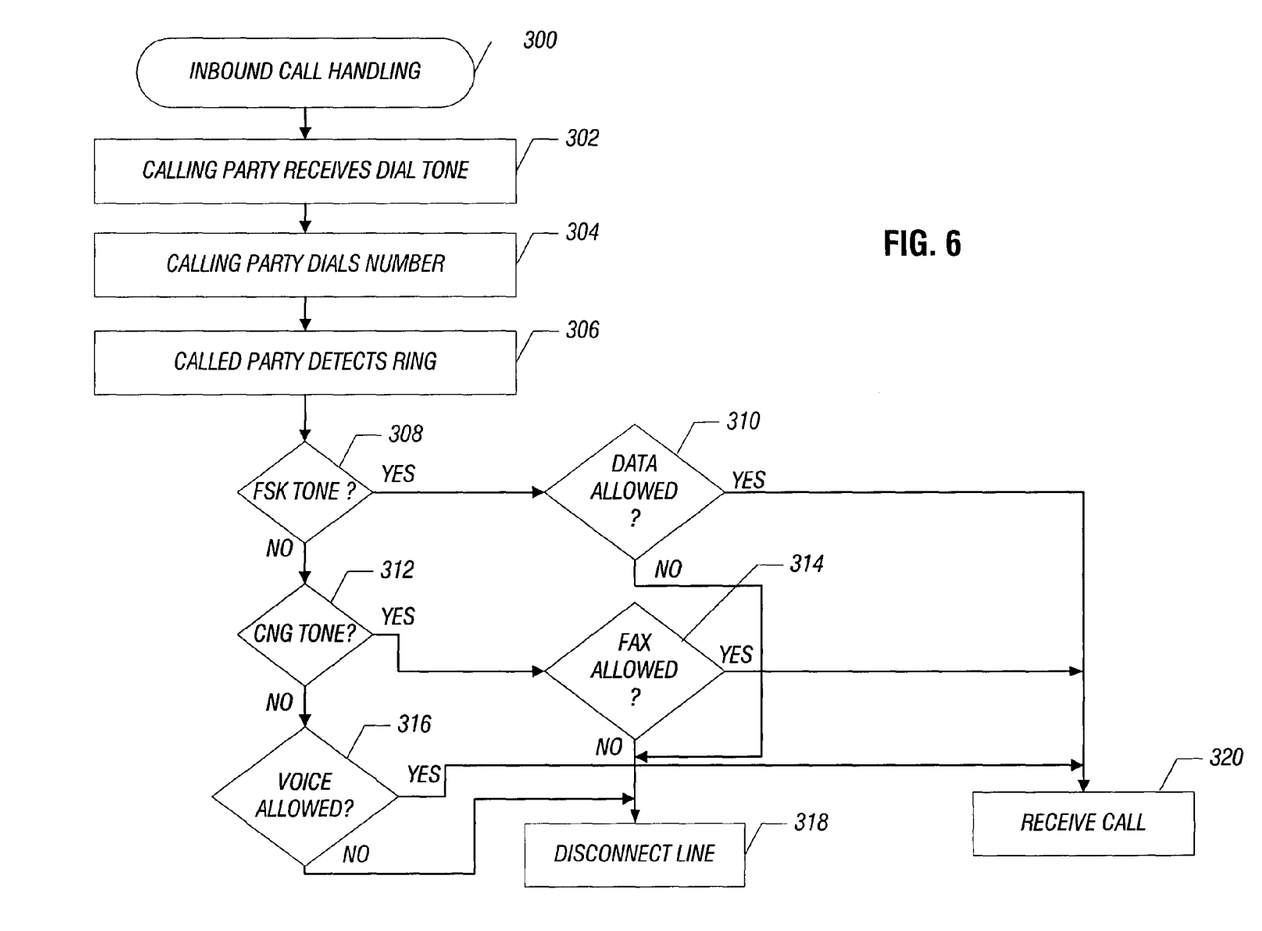
FIG. 6 shows an inbound call handling routine that is invoked when a calling party wishes to place a call to a modem user.

On telephone lines call discrimination is typically performed when a connection is made between a called party and a calling party. Turning to FIG. 6, illustrated is an inbound call handling routine 300 that is invoked when a calling party wishes to place a call to a modem user. In step 302 a calling party goes off hook and receives a dial tone. From step 302 control passes to step 304. In step 304 the calling party dials the number of the called party and hears a ringback. From step 304 control passes to 306. In step 306 the called party detects an inbound ring and answers. Control then passes to step 308. In step 308 the called party's modem discriminator detects whether there is a FSK tone. If the called party's modem detects a FSK tone then control passes to step 310.

The FSK tone is indicative of a data call. In step 310 the inbound data permissions are read. If inbound data calls are allowed control passes to step 320, where the call is received. If inbound data calls are not allowed then control passes to step 318, where the line is disconnected. From step 308, when the called party's modem does not detect an FSK tone control passes to step 312. In step 312 the called party's modem detects whether there is a CNG tone, a fax answer tone, or fax training tones. All of these tones are indicative of a fax call. If a CNG tone exists control passes to step 314. In step 314 the inbound fax permission are read. If an inbound fax call is allowed control passes to step 320. In step 320 the inbound fax is received. Otherwise, control is passed to step 318 where the line is disconnected.

Note that although the modem discriminator is shown as sequentially detecting the FSK and the CNG incoming signals, in actual practice this is typically done simultaneously.

Figure 7:
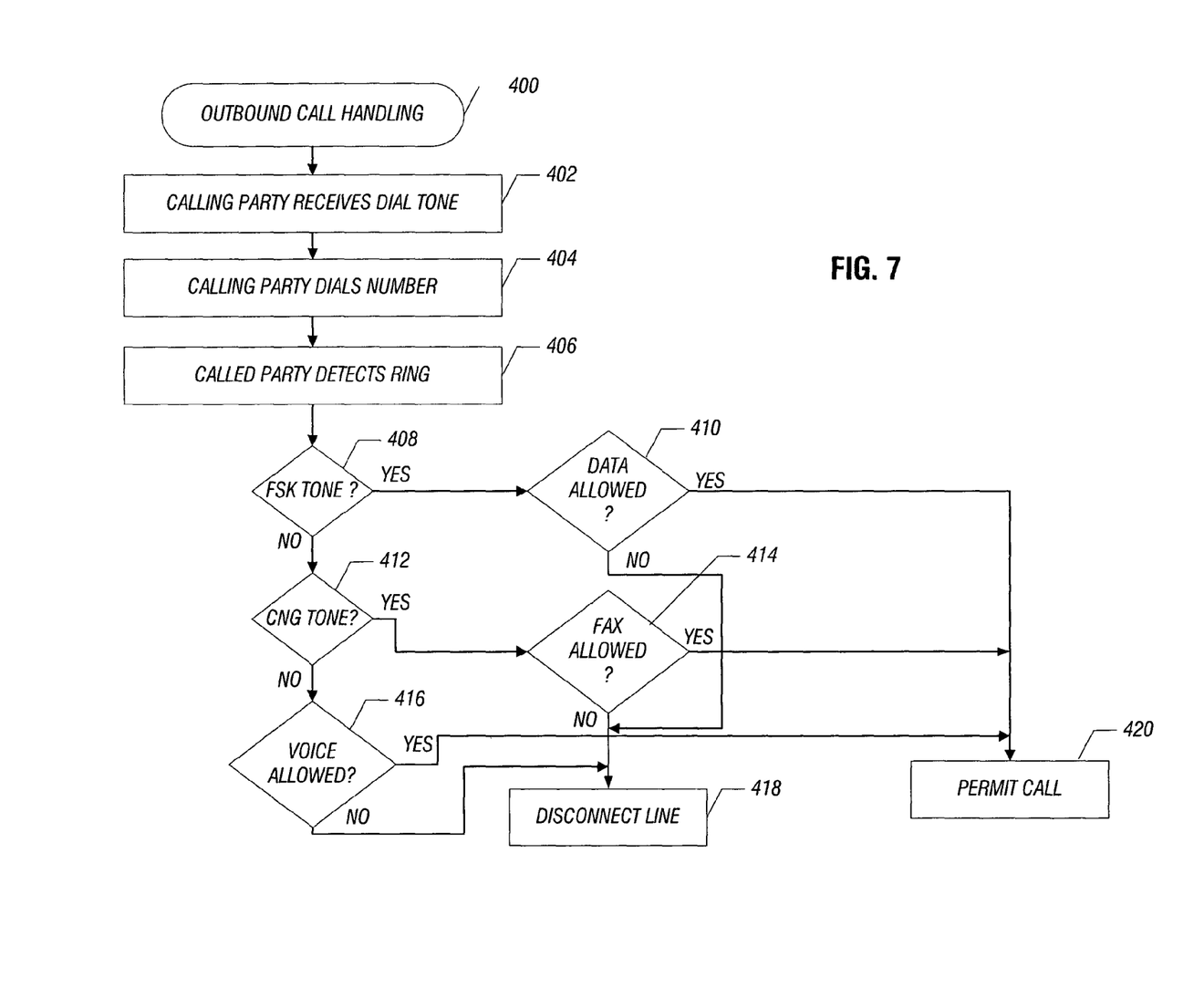
FIG. 7 illustrates a procedure for handling outbound calls.

Turning to FIG. 7, illustrated is an outbound call handling routine 400. This procedure is very similar to the inbound call handling routine 300. In this routine 400 a calling party is the modem user. In step 402 the calling party places the modem off-hook and receives a dial-tone. From step 402 control passes to step 404. In step 404 the calling party dials the number of the called party and determines when the modem detects ringback. From step 404 control passes to step 406. In step 406 the called party detects a ring and goes off-hook or answers. In step 408 if the calling party's modem detects FSK tones then the outbound data permissions are read and control passes to step 410. In step 410 if outbound data calls are allowed control passes to step 420 where the call is permitted. If a FSK tone is not detected in step 408 control transfers to step 412. In step 412 the calling party's modem detects whether a CGN tone (or fax answer or training tone) exists. If the CNG tone exists then control is transferred to step 414. In step 414 the outbound fax permissions are read and if outbound fax calls are allowed control passes to step 420. In step 420 the outbound fax call is permitted to proceed. If outbound faxes are not allowed then control transfers to step 418 where the line is disconnected. If a CNG tone is not detected in step 412 control transfers to step 416. In step 416 an outbound voice call is assumed and the outbound voice permissions are read. If outbound voice calls are allowed control transfers to step 420. If outbound voice calls are not allowed the modem disconnects the line in step 418.

Although the disclosed embodiment is principally directed to software modem, such as controllerless modem implemented on a host system or a digital signal processor, the techniques according to the invention could be similarly implemented employing a modem driver in conjunction with a standard hardware modem that supports telephony features. For example, the modem driver capable of intercepting modem communications at a very low level could include the data, fax, and voice permissions, and disconnect calls that did not meet the required permissions. Preferably, for heightened security the ability to selectively allow or disallow different types of ingoing and outgoing modem calls is implemented at a firmware level within either a host system or the modem itself. In an environment where security is not of paramount importance, or where it is known that the operating system executing on the computer is extremely secure, the selective passing of desired types of calls could be implemented at the driver level.

Also, although the present modem has been disclosed as being implemented with an analog line modem, the examples given could similarly be used on BRI ISDN, PRI ISDN, or other digital transports as well.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of communications in a system, comprising: storing permission data relating to security for the system; receiving a request to establish a telephony call; in response to the request, establishing the telephony call; after establishing the telephony call, detecting for an indication of a type of the telephony call; and determining, based on the permission data relating to security for the system, whether the type of the telephony call is permitted.

2. The method of claim 1, further comprising detecting that the indication indicates a data call.

3. The method of claim 1, further comprising detecting that the indication indicates a voice call.

4. The method of claim 1, further comprising detecting that the indication indicates a fax call.

5. The method of claim 1, wherein detecting for the indication comprises a modem detecting for a tone.

6. The method of claim 5, wherein the modem detecting for the tone comprises the modem detecting for at least one of an FSK tone, CNG tone, fax answer tone, and a fax training tone.

7. The method of claim 6, further comprising indicating a voice call in response to the modem not detecting any of the FSK tone, CNG tone, fax answer tone, and fax training tone.

8. The method of claim 1, further comprising disconnecting the telephony call in response to determining that the telephony call is not permitted.

9. The method of claim 1, wherein storing the permission data comprises storing the permission data in a memory of the system, wherein the receiving, establishing, detecting and determining are performed by the system.

10. The method of claim 9, further comprising setting the permission data through a telephony application programming interface.

11. The method of claim 1, wherein the storing, receiving, establishing, detecting, and determining acts are part of a firewall feature.

12. The method of claim 1, wherein the permission data permits at least a first type of telephony call but disables at least a second, different type of telephony call.

13. A system comprising:
a storage to store permission data relating to security for the system;
an interface to receive a request for a telephony call; and
a control element adapted to:
establish the telephony call in response to the request;
receive an indication of a type of the telephony call during the telephony call; and
determine, based on the indication and the permission data relating to security for the system, whether the type of the telephony call is permitted.

14. The system of claim 13, wherein the control element is adapted to disconnect the telephony call in response to determining that the type of the telephony call is not permitted.

15. The system of claim 13, wherein the indication corresponds to a tone indicative of a data call, fax call, or voice call, wherein the interface comprises a modem adapted to detect the tone, wherein the permission data specifies that at least one of the data call, fax call, and voice call is permitted, but the permission data specifies that at least another one of the data call, fax call, and voice call is not permitted.

16. The system of claim 15, wherein the tone comprises one of an FSK tone, CNG tone, fax answer tone, and fax training tone.

17. The system of claim 16, wherein the control element is adapted to indicate a voice call in response to not detecting any of the FSK tone, CNG tone, fax answer tone, and fax training tone.

18. The system of claim 13, wherein the control element comprises software code and a processor on which the software code is executable.

19. The system of claim 13, wherein the control element comprises firmware and a modem on which the firmware is executable.

20. The system of claim 13, wherein the control element is adapted to provide a firewall task.

21. The system of claim 13, wherein the permission data indicates types of telephony calls that are permitted and not permitted based on security requirements of the system.

22. The system of claim 13, wherein the control element determines that a first type of telephony call is not permitted based on the permission data, and a second, different type of telephony call is permitted based on the permission data.

23. A modem comprising:
a microcontroller to:
receive a request to establish a telephony call;
in response to the request, establish the telephony call;
after establishing the telephony call, detect for an indication of a type of the telephony call; and
determine, based on the indication and permission data relating to a target security level, whether the type of the telephony call is permitted.

24. The modem of claim 23, wherein detecting for the indication comprises detecting for one of an FSK tone, CNG tone, fax answer tone, and fax training tone.

25. The modem of claim 23, wherein the microcontroller is adapted to perform the receiving, establishing, detecting, and determining as part of a firewall task.

26. The modem of claim 23, wherein the permission data indicates types of telephony calls that are permitted and not permitted based on security requirements of a system associated with the modem.

27. The modem of claim 23, wherein the microcontroller determines that a first type of telephony call is permitted based on the permission data, and a second, different type of telephony call is not permitted based on the permission data.

* * * * *

UNITED STATES PATENT AND TRADEMARK OFFICE
CERTIFICATE OF CORRECTION

| | | |
|---|---|---|
| PATENT NO. | : 7,151,823 B2 | Page 1 of 1 |
| APPLICATION NO. | : 10/666027 | |
| DATED | : December 19, 2006 | |
| INVENTOR(S) | : David P. Durkin | |

It is certified that error appears in the above-identified patent and that said Letters Patent is hereby corrected as shown below:

In column 3, line 36, delete "sill" and insert -- skill --, therefor.

Signed and Sealed this

Eighth Day of September, 2009

David J. Kappos
*Director of the United States Patent and Trademark Office*